(12) United States Patent
Cain

(10) Patent No.: US 11,006,570 B2
(45) Date of Patent: May 18, 2021

(54) WHEELED WEED TRIMMER SUPPORT ASSEMBLY

(71) Applicant: Luther Cain, Birmingham, AL (US)

(72) Inventor: Luther Cain, Birmingham, AL (US)

( * ) Notice: Subject to any disclaimer, the term of this patent is extended or adjusted under 35 U.S.C. 154(b) by 54 days.

(21) Appl. No.: 16/418,556

(22) Filed: May 21, 2019

(65) Prior Publication Data
US 2020/0367427 A1    Nov. 26, 2020

(51) Int. Cl.
*A01D 34/00*    (2006.01)
*A01D 34/46*    (2006.01)
*A01D 34/416*    (2006.01)
*A01D 101/00*   (2006.01)

(52) U.S. Cl.
CPC ......... *A01D 34/001* (2013.01); *A01D 34/416* (2013.01); *A01D 34/46* (2013.01); *A01D 2101/00* (2013.01)

(58) Field of Classification Search
CPC .... A01D 34/001; A01D 34/416; A01D 34/46; A01D 34/4165; A01D 34/84; A01D 2101/00
USPC .................... 56/12.7, 17.5; 30/276
See application file for complete search history.

(56) References Cited

U.S. PATENT DOCUMENTS

| | | | |
|---|---|---|---|
| 4,182,100 A * | 1/1980 | Letter ................. | A01D 34/416 172/17 |
| 4,891,931 A | 1/1990 | Holland | |
| 5,092,112 A | 3/1992 | Buckendorf, Jr. | |
| 5,279,102 A * | 1/1994 | Foster ................. | A01D 34/001 56/12.7 |
| D356,583 S | 3/1995 | Cordova | |
| 5,408,816 A * | 4/1995 | Cartier ................ | A01D 34/001 172/17 |
| 5,450,715 A | 9/1995 | Murray | |
| 5,626,006 A | 5/1997 | Fricke, Sr. | |
| 5,829,236 A * | 11/1998 | Ballard ............... | A01D 34/001 56/16.7 |
| 5,836,142 A | 11/1998 | Maxwell | |
| 5,884,462 A | 3/1999 | Gerber | |
| 6,050,069 A | 4/2000 | Elensky | |
| 6,085,503 A * | 7/2000 | Hutchinson .......... | A01D 34/001 248/230.1 |
| 7,360,350 B1 * | 4/2008 | Smith, Jr. ............ | A01D 34/001 56/12.7 |
| 7,823,370 B1 | 11/2010 | Wiebe et al. | |
| 9,131,639 B1 * | 9/2015 | Groves ................ | A01D 34/902 |
| 2009/0090011 A1 | 4/2009 | Gosschalk | |
| 2015/0289697 A1 * | 10/2015 | Kovatchev ............. | A47G 25/32 223/85 |

(Continued)

*Primary Examiner* — Thomas B Will
*Assistant Examiner* — Matthew Ian Neal

(57) ABSTRACT

A wheeled weed trimmer support assembly for using a weed trimmer to evenly and easily cut grass includes a rear support apparatus and a front support apparatus. The rear support apparatus comprises a rear clamp that is selectively engageable with a shaft of a weed trimmer and a rear support coupled to the rear clamp. A rotational joint is coupled to the rear support. A rear fork is coupled to a bottom portion of the rotational joint and a rear wheel is coupled to the rear fork. The front support apparatus comprises a front clamp that is selectively engageable with the shaft of the weed trimmer. A front support is coupled to the front clamp. A front fork is coupled to a front bottom end of the front support and a pair of front wheels is coupled to the front fork.

10 Claims, 5 Drawing Sheets

(56) References Cited

U.S. PATENT DOCUMENTS

2017/0196166 A1* 7/2017 Filipowers .............. B60B 33/04

* cited by examiner

WHEELED WEED TRIMMER SUPPORT ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION (1) Field of the Invention (2) Description of Related Art Including Information Disclosed Under 37 CFR 1.97 and 1.98

The disclosure and prior art relates to lawn tools and more particularly pertains to a new lawn tool for using a weed trimmer to evenly and easily cut grass.

BRIEF SUMMARY OF THE INVENTION

An embodiment of the disclosure meets the needs presented above by generally comprising a rear support apparatus and a front support apparatus. The rear support apparatus comprises a rear clamp that is selectively engageable with a shaft of a weed trimmer proximal a motor of the weed trimmer. A rear support is coupled to the rear clamp. The rear support has a rear top end coupled to the rear clamp and a rear bottom end. A rotational joint is coupled to the rear support. The rotational joint has a top portion coupled to the rear bottom end and a bottom portion rotatingly coupled to the top portion. A rear fork is coupled to the bottom portion of the rotational joint. A rear wheel is coupled to the rear fork. The front support apparatus comprises a front clamp that is selectively engageable with the shaft of the weed trimmer proximal a cutter of the weed trimmer. A front support is coupled to the front clamp. The front support has a front top end coupled to the front clamp and a front bottom end. A front fork is coupled to the front bottom end of the front support. A pair of front wheels is coupled to the front fork. The pair of front wheels comprises a right wheel and a left wheel coupled to a right extension and a left extension of the front fork, respectively.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
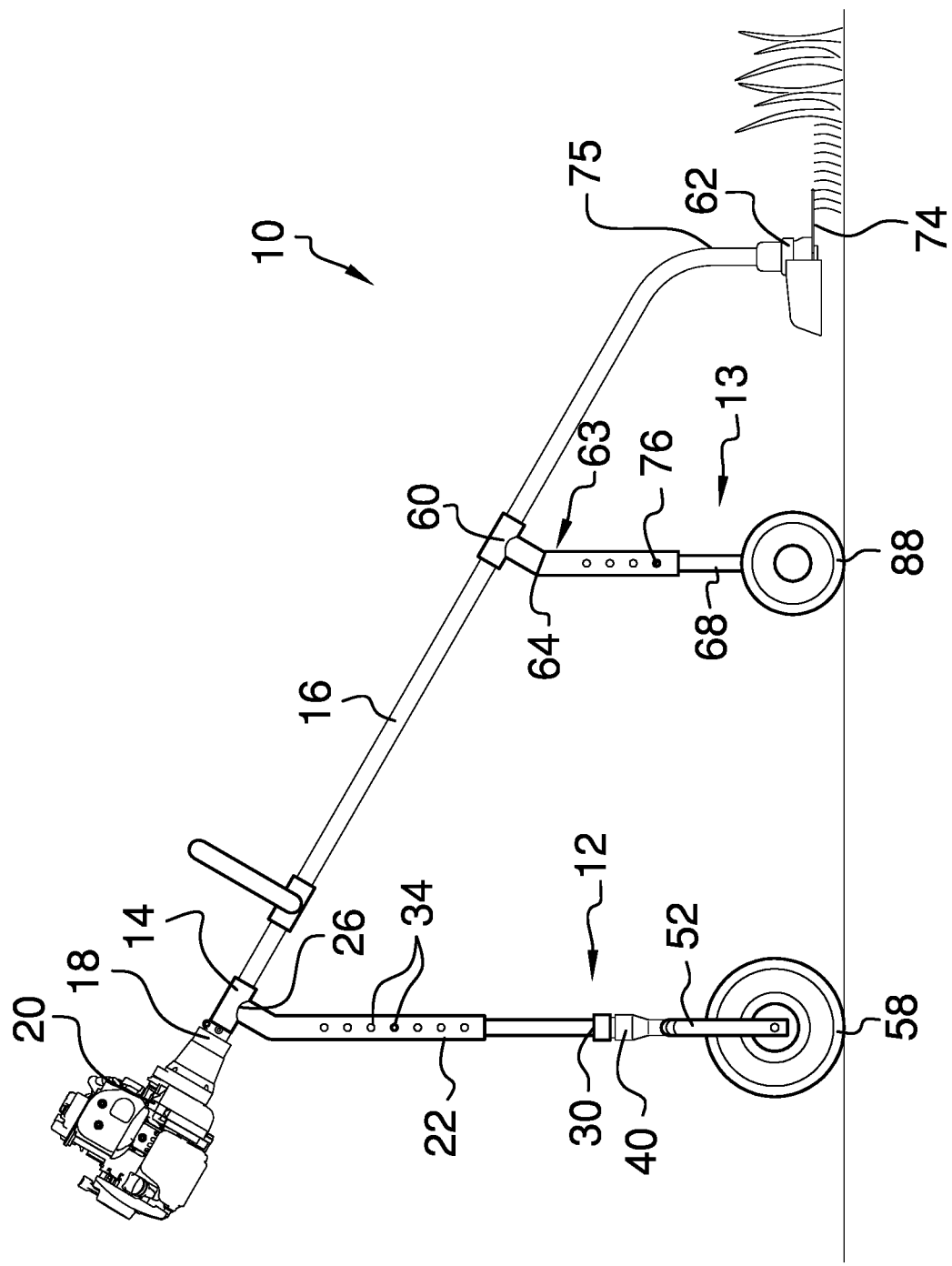
FIG. 1 is a side elevation in-use view of a wheeled weed trimmer support assembly according to an embodiment of the disclosure.
Figure 2:
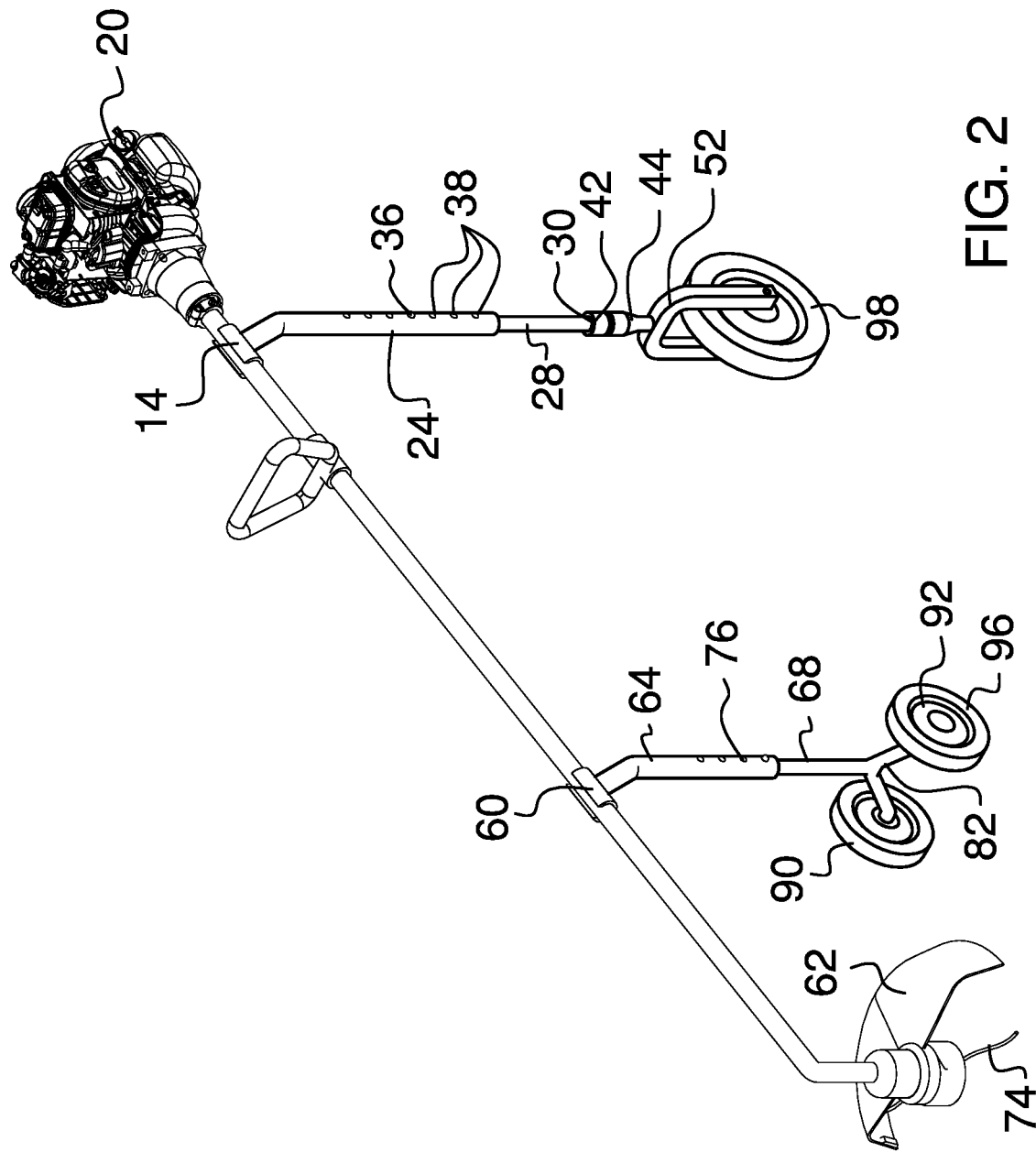
FIG. 2 is an isometric in-use view of an embodiment of the disclosure.
Figure 3:
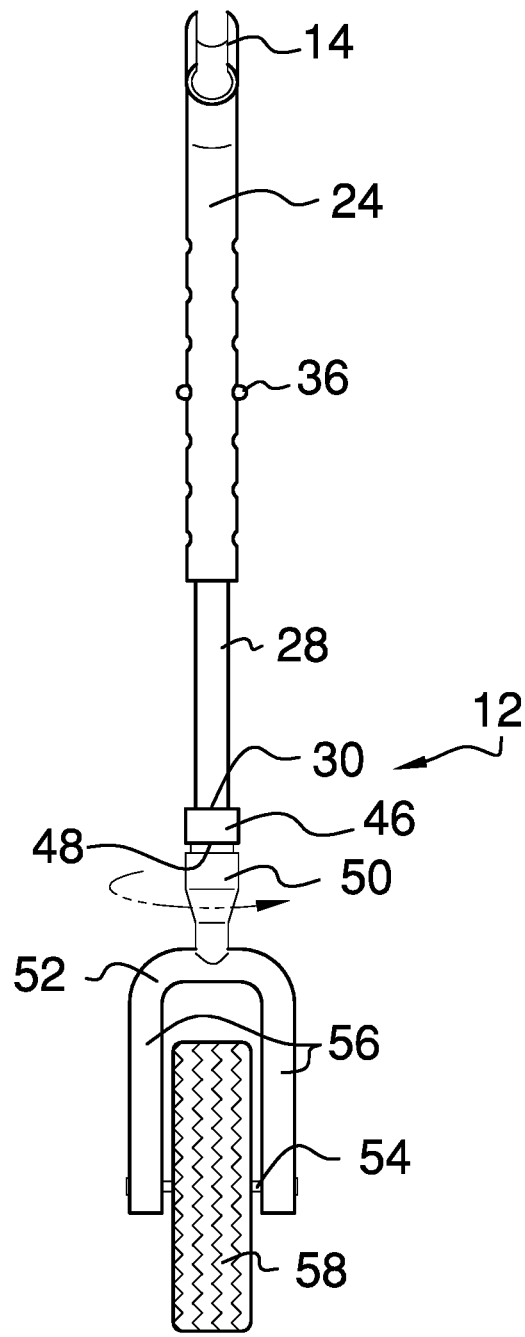
FIG. 3 is a front elevation view of an embodiment of the disclosure.
Figure 4:
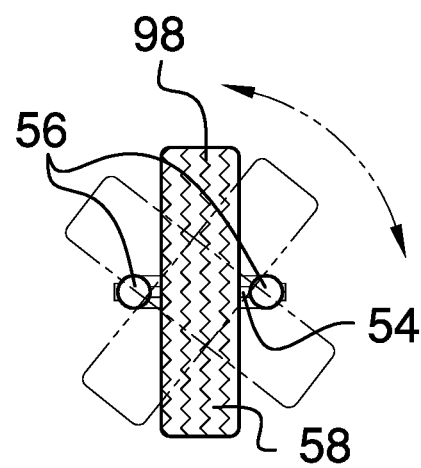
FIG. 4 is a bottom plan view of an embodiment of the disclosure.
Figure 5:
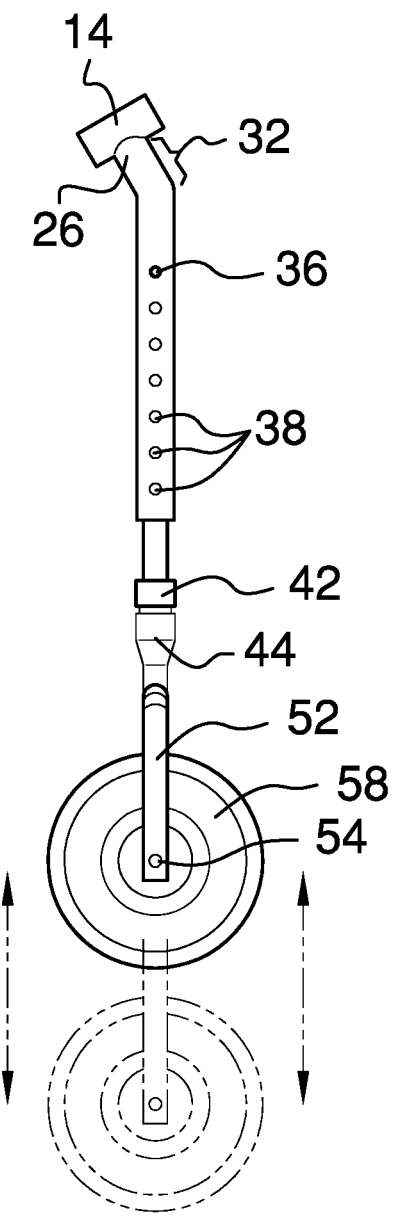
FIG. 5 is a side elevation view of an embodiment of the disclosure.
Figure 6:
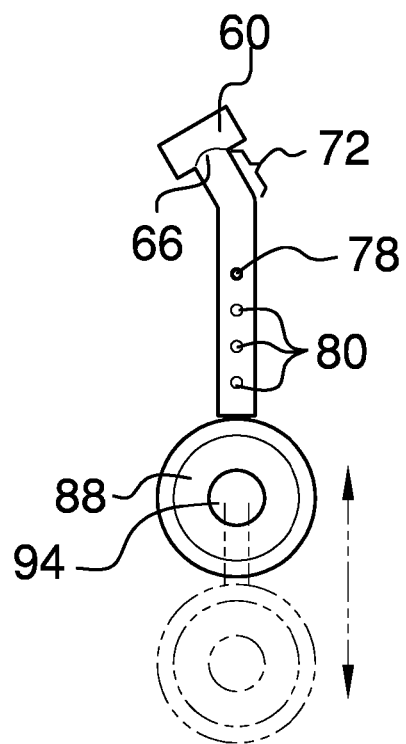
FIG. 6 is a side elevation view of an embodiment of the disclosure.
Figure 7:
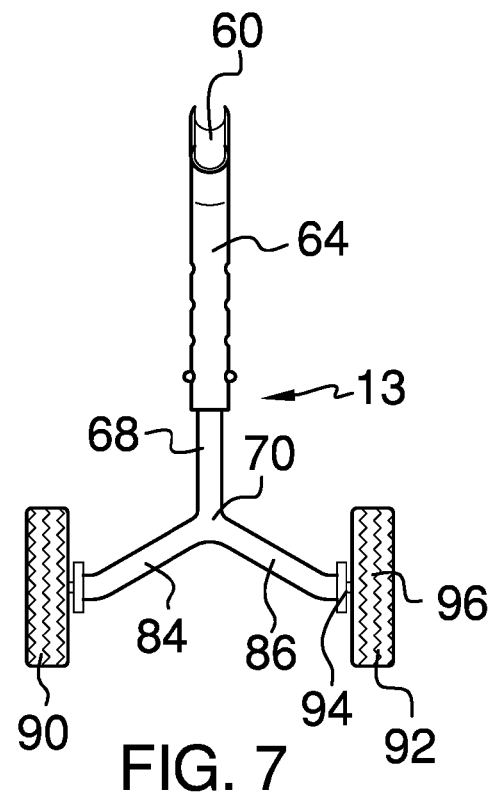
FIG. 7 is a front view of an embodiment of the disclosure.

With reference now to the drawings, and in particular to FIGS. 1 through 7 thereof, a new lawn tool embodying the principles and concepts of an embodiment of the disclosure and generally designated by the reference numeral 10 will be described.

As best illustrated in FIGS. 1 through 7, the wheeled weed trimmer support assembly 10 generally comprises a rear support apparatus 12 and a front support apparatus 13. The rear support apparatus 12 comprises a rear clamp 14. The rear clamp 14 is semi cylindrical and has a profile greater than 200°. The rear clamp 14 is flexible such that the rear clamp 14 is configured to selectively receive and alternatively release a shaft 16 of a weed trimmer 18 proximal a motor 20 of the weed trimmer. A rear support 22 comprises a rear upper tube 24 having a rear top end 26 coupled to the rear clamp 14 and a rear lower shaft 28 having a rear bottom end 30. The rear upper tube 24 has a rear bent portion 32 proximal the rear top end 26. The rear lower shaft 28 is slidingly coupled within the rear upper tube 24. A rear adjustment mechanism 34 is coupled to the rear support 22 and comprises a rear spring-loaded protrusion 36 coupled to the rear lower shaft 28 and a plurality of rear adjustment apertures 38 extending through the rear upper tube 24. The rear protrusion 36 is selectively engageable with each of the plurality of rear adjustment apertures 38 to adjust a height of the rear support 22.

A rotational joint 40 is coupled to the rear support 22. The rotational joint 40 has a top portion 42 coupled to the rear bottom end 30 and a bottom portion 44 rotatingly coupled to the top portion 42. The top portion 42 has an upper collar 46 and an inner axle 48 and the bottom portion 44 is coupled to the inner axle 48 and has a tapered lower collar 50. A rear fork 52 is coupled to the bottom portion 44 of the rotational joint. The rear fork 52 is an inverted U-shape and has a rear axle 54 extending between a pair of arms 56. A rear wheel 58 is coupled to the rear axle 54.

The front support apparatus 13 comprises a front clamp 60. The front clamp 60 is semi cylindrical and has a profile greater than 200°. The front clamp 60 is flexible such that the front clamp 60 is configured to selectively receive and alternatively release the shaft 16 of the weed trimmer proximal a cutter 62 of the weed trimmer. A front support 63 is coupled to the front clamp 60. The front support 63 comprises a front upper tube 64 having a front top end 66 coupled to the front clamp 60 and front lower shaft 68 having a front bottom end 70. The front upper tube 64 has a front bent portion 72 proximal the front top end 66. The rear bent portion 32 and the front bent portion 72 are configured to arrange the rear clamp 14 and the front clamp 60 such that they secure the shaft 16 of the weed trimmer at an angle that positions a blade 74 of the weed trimmer horizontal. The angle of the rear bent portion 32 and the front bent portion 72 is configured to match an angle between the shaft 16 of the weed trimmer and a vertical neck 75 of the weed trimmer extending between the shaft 16 and the cutter 62. The front lower shaft 68 is slidingly coupled within the front upper tube 64. A front adjustment mechanism 76 is coupled to the front support 63 and comprises a front spring-loaded protrusion 78 coupled to the front lower shaft 68 and a plurality of front adjustment apertures 80 extending through the front upper tube 64. The front protrusion 78 is selectively engageable with each of the plurality of front adjustment apertures 80 to adjust a height of the front support 63.

A front fork 82 is coupled to the front bottom end 70 of the front support 63 and has a right extension 84 and a left extension 86 forming an inverted Y-shape. A pair of front wheels 88 comprises a right wheel 90 and a left wheel 92 each having a hub 94 coupled to the right extension 84 and the left extension 86, respectively. Each of the pair of front wheels 88 is smaller than the rear wheel 58. Each of the pair of front wheels 88 and the rear wheel 58 may have a front rubberized tread 96 and a rear rubberized tread 98, respectively.

In use, rear clamp 14 and the front clamp 60 are engaged with the shaft 16 of the weed trimmer and the rear adjustment mechanism 34 and the front adjustment mechanism 76 are manipulated to place the cutter 62 at the desired height. The weed trimmer 18 is then pushed around to evenly cut grass.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A wheeled weed trimmer support assembly comprising:
   a rear support apparatus comprising:
      a rear clamp, the rear clamp being selectively engageable with a shaft of a weed trimmer proximal a motor of the weed trimmer whereby the shaft of the weed trimmer is secured in a fixed position relative to the rear clamp;
      a rear support coupled to the rear clamp, the rear support having a rear top end coupled to the rear clamp and a rear bottom end;
      a rotational joint coupled to the rear support, the rotational joint having a top portion coupled to the rear bottom end and a bottom portion rotatingly coupled to the top portion;
      a rear fork coupled to the rotational joint, the rear fork being coupled to the bottom portion; and
      a rear wheel coupled to the rear fork; and
   a front support apparatus comprising:
      a front clamp, the front clamp being selectively engageable with the shaft of the weed trimmer proximal a cutter of the weed trimmer;
      a front support coupled to the front clamp, the front support having a front top end coupled to the front clamp and a front bottom end;
      a front fork coupled to the front support, the front fork being coupled to the front bottom end; and
      a pair of front wheels coupled to the front fork, the pair of front wheels comprising a right wheel and a left wheel coupled to a right extension and a left extension of the front fork, respectively, the front clamp, front support, front fork being coupled together such that the shaft of the weed trimmer is securable in a fixed position relative to each of the front clamp, front support, and front fork whereby the cutter of the weed trimmer is supported in a fixed position over a support surface.

2. The wheeled weed trimmer support assembly of claim 1 further comprising the rear support comprising a rear upper tube and a rear lower shaft, the rear lower shaft being slidingly coupled within the rear upper tube, a rear adjustment mechanism being coupled to the rear support and selectively engaging the rear upper tube and the rear lower shaft to adjust a height of the rear support, the front support comprising a front upper tube and a front lower shaft, the front lower shaft being slidingly coupled within the front upper tube, a front adjustment mechanism being coupled to the front support and selectively engaging the front upper tube and the front lower shaft to adjust a height of the front support.

3. The wheeled weed trimmer support assembly of claim 2 further comprising the rear adjustment mechanism comprising a rear spring-loaded protrusion coupled to the rear lower shaft and a plurality of rear adjustment apertures extending through the rear upper tube, the rear spring-loaded protrusion being selectively engageable with each of the plurality of rear adjustment apertures, the front adjustment mechanism comprising a front spring-loaded protrusion coupled to the front lower shaft and a plurality of front adjustment apertures extending through the front upper tube, the front spring-loaded protrusion being selectively engageable with each of the plurality of front adjustment apertures.

4. The wheeled weed trimmer support assembly of claim 2 further comprising the rear upper tube having a rear bent portion proximal the rear top end and the front upper tube having a front bent portion proximal the front top end, the rear bent portion and the front bent portion being configured to arrange the rear clamp and the front clamp such that they secure the shaft of the weed trimmer at an angle that positions a blade of the weed trimmer horizontal.

5. The wheeled weed trimmer support assembly of claim 1 further comprising each of the rear clamp and the front clamp being semi cylindrical and having a profile greater than 200° and being flexible such that they are configured to selectively receive and alternatively release the shaft of the weed trimmer.

6. The wheeled weed trimmer support assembly of claim 2 further comprising the top portion of the rotational joint having an upper collar and an inner axle, the bottom portion being coupled to the inner axle and having a tapered lower collar.

7. The wheeled weed trimmer support assembly of claim 1 further comprising the rear fork being an inverted U-shape and having a rear axle extending between a pair of arms of the rear fork, the rear wheel being coupled to the rear axle.

8. The wheeled weed trimmer support assembly of claim 1 further comprising the right extension and the left extension of the front fork forming an inverted Y-shape, each of the right wheel and the left wheel having a hub coupled to the right extension and the left extension, respectively.

9. The wheeled weed trimmer support assembly of claim 1 further comprising each of the pair of front wheels being smaller than the rear wheel.

10. A wheeled weed trimmer support assembly comprising:
  a rear support apparatus comprising:
    a rear clamp, the rear clamp being selectively engageable with a shaft of a weed trimmer proximal a motor of the weed trimmer whereby the shaft of the weed trimmer is secured in a fixed position relative to the rear clamp, the rear clamp being semi cylindrical and having a profile greater than 200° and being flexible such that the rear clamp is configured to selectively receive and alternatively release the shaft of the weed trimmer;
    a rear support coupled to the rear clamp, the rear support having a rear top end coupled to the rear clamp and a rear bottom end, the rear support comprising a rear upper tube and a rear lower shaft, the rear upper tube having a rear bent portion proximal the rear top end, the rear lower shaft being slidingly coupled within the rear upper tube, a rear adjustment mechanism being coupled to the rear support and comprising a rear spring-loaded protrusion coupled to the rear lower shaft and a plurality of rear adjustment apertures extending through the rear upper tube, the rear protrusion being selectively engageable with each of the plurality of rear adjustment apertures to adjust a height of the rear support;
    a rotational joint coupled to the rear support, the rotational joint having a top portion coupled to the rear bottom end and a bottom portion rotatingly coupled to the top portion, the top portion having an upper collar and an inner axle, the bottom portion being coupled to the inner axle and having a tapered lower collar;
    a rear fork coupled to the rotational joint, the rear fork being coupled to the bottom portion, the rear fork being an inverted U-shape and having a rear axle extending between a pair of arms; and
    a rear wheel coupled to the rear fork, the rear wheel being coupled to the rear axle; and
  a front support apparatus comprising:
    a front clamp, the front clamp being semi cylindrical and having a profile greater than 200° and being flexible such that the front clamp is configured to selectively receive and alternatively release the shaft of the weed trimmer proximal a cutter of the weed trimmer;
    a front support coupled to the front clamp, the front support having a front top end coupled to the front clamp and a front bottom end, the front support comprising a front upper tube and a front lower shaft, the front upper tube having a front bent portion proximal the front top end, the rear bent portion and the front bent portion being configured to arrange the rear clamp and the front clamp such that they secure the shaft of the weed trimmer at an angle that positions a blade of the weed trimmer horizontal, the front lower shaft being slidingly coupled within the front upper tube, a front adjustment mechanism being coupled to the front support and comprising a front spring-loaded protrusion coupled to the front lower shaft and a plurality of front adjustment apertures extending through the front upper tube, the front protrusion being selectively engageable with each of the plurality of front adjustment apertures to adjust a height of the front support;
    a front fork coupled to the front support, the front fork being coupled to the front bottom end, the front fork having a right extension and a left extension forming an inverted Y-shape; and
    a pair of front wheels coupled to the front fork, the pair of front wheels comprising a right wheel and a left wheel each having a hub coupled to the right extension and the left extension, respectively, each of the pair of front wheels being smaller than the rear wheel, the front clamp, front support, front fork being coupled together such that the shaft of the weed trimmer is securable in a fixed position relative to each of the front clamp, front support, and front fork whereby the cutter of the weed trimmer is supported in a fixed position over a support surface.

* * * * *